(12) United States Patent
Suh et al.

(10) Patent No.: US 12,200,481 B2
(45) Date of Patent: Jan. 14, 2025

(54) METHOD AND APPARATUS FOR PROTECTING INFORMATION IN WIRELESS COMMUNICATION SYSTEM

(71) Applicant: Samsung Electronics Co., Ltd., Suwon-si (KR)

(72) Inventors: Kyungjoo Suh, Suwon-si (KR); Kisuk Kweon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 241 days.

(21) Appl. No.: 17/635,895

(22) PCT Filed: Aug. 12, 2020

(86) PCT No.: PCT/KR2020/010646
§ 371 (c)(1),
(2) Date: Feb. 16, 2022

(87) PCT Pub. No.: WO2021/033991
PCT Pub. Date: Feb. 25, 2021

(65) Prior Publication Data
US 2022/0312197 A1    Sep. 29, 2022

(30) Foreign Application Priority Data
Aug. 16, 2019    (KR) .................. 10-2019-0100543

(51) Int. Cl.
*H04W 12/0431* (2021.01)
*H04W 12/06* (2021.01)
*H04W 60/00* (2009.01)

(52) U.S. Cl.
CPC ....... *H04W 12/0431* (2021.01); *H04W 12/06* (2013.01); *H04W 60/00* (2013.01)

(58) Field of Classification Search
CPC ..... H04W 12/06; H04W 60/00; H04W 12/08; H04W 48/18; H04W 76/11; H04W 76/10;
(Continued)

(56) References Cited

U.S. PATENT DOCUMENTS 10,200,543 B2    2/2019    Senarath et al.
2019/0104134 A1*  4/2019    Lee .................. H04W 12/10
(Continued)

FOREIGN PATENT DOCUMENTS

WO    2019/017689 A1    1/2019
WO    2019/144310 A1    8/2019

OTHER PUBLICATIONS

3GPP TS 33.501, Technical Specification Group Services and System Aspects, Dec. 2018.
(Continued)

*Primary Examiner* — Kwasi Karikari
(74) *Attorney, Agent, or Firm* — Jefferson IP Law, LLP

(57) ABSTRACT

The disclosure relates to a method and apparatus for protecting information in a wireless communication system, and an operating method of a user equipment (UE) in the wireless communication system may include: transmitting, to an access and mobility management function (AMF), a registration request message including security information related to a security key processing capability of the UE; receiving, from the AMF, an authentication request message; transmitting, to the AMF, an authentication response message in response to the authentication request message; receiving, from the AMF, a security mode command message; and transmitting a security mode complete message in response to the security mode command message.

15 Claims, 4 Drawing Sheets

(58) Field of Classification Search
CPC ... H04W 76/12; H04W 12/041; H04W 12/72; H04W 8/18; H04W 8/08; H04W 12/069; H04W 12/04; H04W 12/03; H04W 12/0433; H04W 36/0016; H04W 36/00
See application file for complete search history.

(56) References Cited

U.S. PATENT DOCUMENTS

2019/0246282 A1    8/2019  Li et al.
2020/0280849 A1*   9/2020  Ito .......................... H04W 12/06

OTHER PUBLICATIONS

Huawei et al., Enforcement of Session Key with DH Procedure in Serving Networks, S3-173156, 3GPP TSG SA WG3 (Security) Meeting #89 Nov. 27-Dec. 1, 2017, Reno, USA.
Extened European Search Report dated Aug. 2, 2022, issued in European Patent Application No. 20854027.8.
'3GPP; TSG CN; Non-Access-Stratum (NAS) protocol for 5G System (5GS); Stage 3 (Release 15)', Jun. 2019.
'3GPP; TSG SA; Security architecture and procedures for 5G system (Release 15)', Jun. 2019.
European Office Action dated Feb. 26, 2024, issued in a European Patent Application No. 20854027.8.
Korean Office Action dated Apr. 26, 2024, issued in a Korean Patent Application No. 10-2019-0100543.
3GPP Ts 24.501 v16.1.0, Release 16, Jun. 2019.

* cited by examiner

METHOD AND APPARATUS FOR PROTECTING INFORMATION IN WIRELESS COMMUNICATION SYSTEM

TECHNICAL FIELD

The disclosure relates to a method and apparatus for protecting information in a wireless communication system, and more particularly, to a method and apparatus for protecting information in a 5th generation (5G) communication system.

BACKGROUND ART

In order to meet increasing demand with respect to wireless data traffic after the commercialization of $4^{th}$ generation (4G) communication systems, efforts have been made to develop evolved $5^{th}$ generation (5G) system or pre-5G communication system. For this reason, 5G or pre-5G communication systems are called 'beyond 4G network' communication systems or 'post long term evolution (post-LTE)' systems. In order to achieve high data rates, implementation of 5G communication systems in an ultra-high frequency or millimeter-wave (mmWave) band (e.g., a 60 GHz band) is being considered. In order to reduce path loss of radio waves and increase a transmission distance of radio waves in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied. Also, in order to improve system networks for 5G communication systems, various technologies such as evolved small cells, advanced small cells, cloud Radio Access Networks (Cloud-RAN), ultra-dense networks, Device-To-Device communication (D2D), wireless backhaul, moving networks, cooperative communication, Coordinated Multi-Points (COMP), interference cancellation, or the like have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), sparse code multiple access (SCMA), or the like have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. In order to implement the IoT, various technological elements such as sensing technology, wired/wireless communication and network infrastructures, service interface technology, and security technology are required, such that, in recent years, technologies related to sensor networks for connecting objects, Machine-To-Machine (M2M) communication, and Machine-Type Communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies such as sensor networks, M2M communication, MTC, or the like are being implemented by using 5G communication techniques including beamforming, MIMO, array antennas, or the like. Application of Cloud-RAN as the above-described big data processing technology may be an example of convergence of 5G communication technology and IoT technology.

Because various services can be provided due to the aforementioned development of wireless communication systems, there is a demand for a method of seamlessly providing such services. For example, there is a demand for a method of protecting information in a 5G communication system

DESCRIPTION OF EMBODIMENTS

Solution to Problem

Based on the discussion described above, the disclosure provides a method and apparatus for protecting information in a wireless communication system.

BEST MODE

Figure 1:
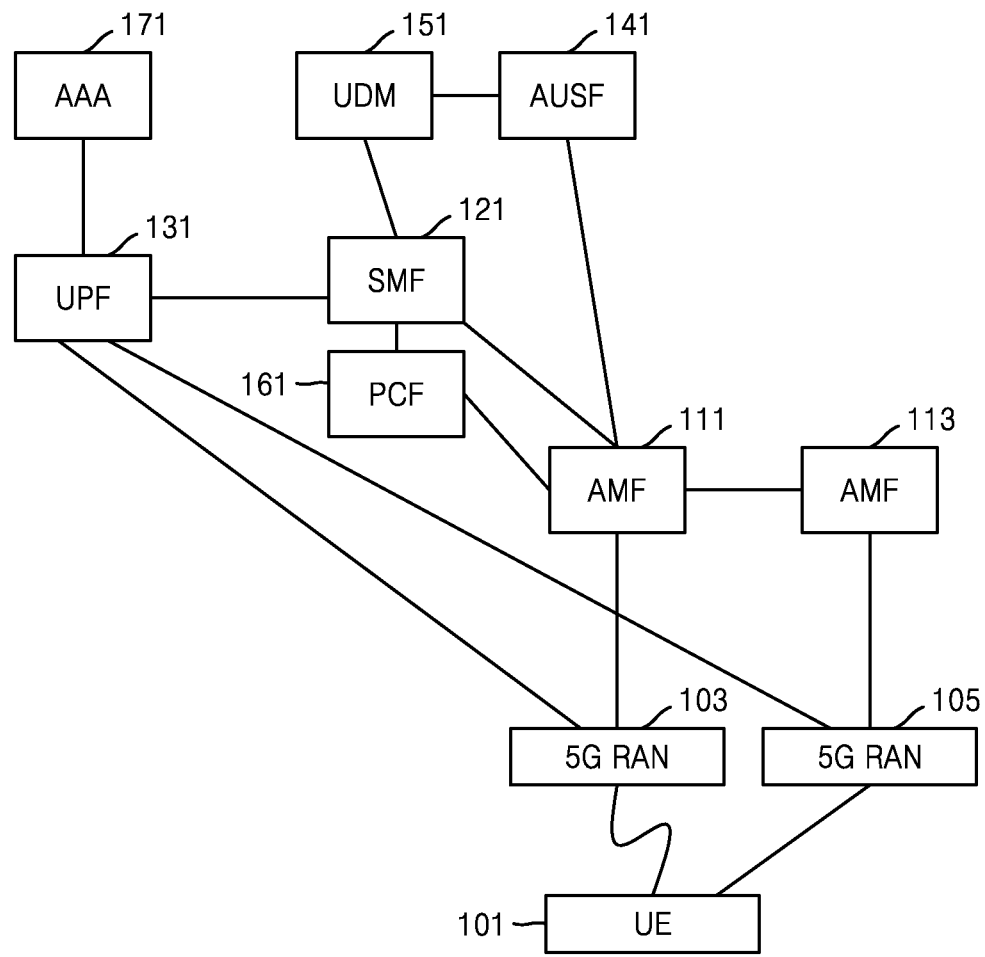
FIG. 1 illustrates an example of a user equipment (UE) and a network environment for a security procedure and a security scheme for protecting communication in a $5^{th}$ generation (5G) network according to an embodiment of the disclosure.

According to an embodiment of the disclosure, an operating method of a user equipment (UE) in a wireless communication system may include: transmitting, to an access and mobility management function (AMF), a registration request message including security information related to a security key processing capability of the UE; receiving, from the AMF, an authentication request message; transmitting, to the AMF, an authentication response message in response to the authentication request message; receiving, from the AMF, a security mode command message; and transmitting a security mode complete message in response to the security mode command message.

According to an embodiment of the disclosure, a user equipment (UE) in a wireless communication system may include: a transceiver; and at least one processor configured to transmit, via the transceiver to an access and mobility management function (AMF), a registration request message including security information related to a security key processing capability of the UE; receive, via the transceiver from the AMF, an authentication request message; transmit, via the transceiver to the AMF, an authentication response message in response to the authentication request message; receive, via the transceiver from the AMF, a security mode command message; and transmit, via the transceiver, a security mode complete message in response to the security mode command message.

According to an embodiment of the disclosure, an operating method of an access and mobility management function (AMF) in a wireless communication system may include: receiving, from a user equipment (UE), a registration request message including security information related to a security key processing capability of the UE; transmitting, to the UE, an authentication request message; receiving, from the UE, an authentication response message in response to the authentication request message; transmitting, to the UE, a security mode command message; and receiving, from the UE, a security mode complete message in response to the security mode command message.

MODE OF DISCLOSURE

Embodiments of the disclosure will now be described more fully with reference to the accompanying drawings. In the descriptions of embodiments, detailed explanations of the related art are omitted when it is deemed that they may unnecessarily obscure the essence of the disclosure. The terms used in the specification are defined in consideration of functions used in the disclosure, and can be changed according to the intent or commonly used methods of users or operators. Accordingly, definitions of the terms are understood based on the entire description of the present specification.

The advantages and features of the disclosure and methods of achieving them will become apparent with reference to embodiments described in detail below with reference to the accompanying drawings. The disclosure may, however, be embodied in many different forms and should not be construed as limited to embodiments set forth herein; rather these embodiments are provided so that this disclosure will be thorough and complete, and will fully convey the scope of the disclosure only defined by the claims to one of ordinary skill in the art. Throughout the specification, the same elements are denoted by the same reference numerals.

It will be understood that each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed via the processor of the computer or other programmable data processing apparatus, generate means for performing functions specified in the flowchart block or blocks. The computer program instructions may also be stored in a computer-executable or computer-readable memory that may direct the computer or other programmable data processing apparatus to function in a particular manner, such that the instructions stored in the computer-executable or computer-readable memory produce an article of manufacture including instruction means that perform the functions specified in the flowchart block or blocks. The computer program instructions may also be loaded onto the computer or other programmable data processing apparatus to cause a series of operations to be performed on the computer or other programmable apparatus to produce a computer implemented process such that the instructions that are executed on the computer or other programmable apparatus provide operations for implementing the functions specified in the flowchart block or blocks.

In addition, each block of the flowchart illustrations may represent a module, segment, or portion of code, which includes one or more executable instructions for performing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used in the present embodiment of the disclosure refers to a software or hardware component, such as field-programmable gate array (FPGA) or application-specific integrated circuit (ASIC), which performs certain tasks. However, the term "unit" does not mean to be limited to software or hardware. A "unit" may be configured to be in an addressable storage medium or configured to operate one or more processors. Thus, according to an embodiment, a "unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the components and "units" may be combined into fewer components and "units" or may be further separated into additional components and "units". Further, the components and "units" may be implemented to operate one or more central processing units (CPUs) in a device or a secure multimedia card. Also, a "unit" may include one or more processors in embodiments.

In the following descriptions of the disclosure, well-known functions or configurations are not described in detail because they would obscure the disclosure with unnecessary details. Embodiments of the disclosure will now be described more fully with reference to the accompanying drawings.

Hereinafter, terms identifying an access node, terms indicating network entities, terms indicating messages, terms indicating an interface between network entities, and terms indicating various pieces of identification information, as used in the following description, are exemplified for convenience of explanation. Accordingly, the disclosure is not limited to terms to be described below, and other terms indicating objects having equal technical meanings may be used.

For convenience of descriptions, the disclosure uses some terms and names defined in the $3^{rd}$ Generation Partnership Project (3GPP) long term evolution (LTE) standards. However, the disclosure is not limited to these terms and names, and may be equally applied to communication systems conforming to other standards. In the disclosure, an evolved node B (eNB) may be interchangeably used with a next-generation node B (gNB) for convenience of explanation. That is, a base station described by an eNB may represent a gNB. Also, the term "terminal" may refer to not only mobile phones, narrowband IoT (NB-IoT) devices, and sensors but also other wireless communication devices.

Hereinafter, a base station (BS) is an entity that allocates resources to a terminal, and may be at least one of gNode B, eNode B, Node B, BS, a radio access unit, a BS controller, or a node on a network. Examples of the terminal may include a user equipment (UE), a mobile station (MS), a cellular phone, a smartphone, a computer, a multimedia system capable of performing a communication function, or the like. However, the disclosure is not limited to the example above.

According to an embodiment of the disclosure, an operating method of a UE in a wireless communication system may include: transmitting a registration request message including security information to an access and mobility management function (AMF); receiving an authentication request message from the AMF; and transmitting, to the AMF, a response message in response to the authentication request message.

Disclosed embodiments provide an apparatus and method for effectively protecting information in a 5G communication system.

The disclosure relates to a security scheme which is to be used in a UE and a network system and to be applied to next-generation 5G communication. The disclosure relates to a security method and apparatus performing the method for preventing attack from an attacker due to old security information or the like, with respect to a scheme of processing security capabilities of a UE and network and an information delivery of the UE and network through the scheme.

As 5G communication is introduced, an AMF that is a management entity for managing mobility of a UE and a session management function (SMF) that is an entity for managing a session are separate. Accordingly, legacy 4G LTE communication employs an operating scheme by which a mobility management entity (MME) manages both mobility and session, but in 5G mobile communication, a mobility management entity and a session management entity are separate, and thus, a communication scheme and a communication management scheme between a UE and network entities are changed.

As the 5G communication is introduced, with respect to non 3GPP access, mobility management may be performed by the AMF and session management may be performed by the SMF via Non-3GPP Inter Working Function (N3IWF). Also, not only mobility management but also security-related information that is an important factor in the mobility management may be managed by the AMF.

With the introduction of the 5G communication, a method of protecting a UE or a system and a method of hierarchically protecting information are introduced which are different from a legacy protection method, but despite of the introduction of a secure method, the UE or the system may be attacked by an attacker due to its old security information.

Accordingly, the disclosure provides a method of managing security-related information in communication between a UE and a network. For example, the UE and the network may manage their security information not to be outdated. Also, the disclosure provides a method by which the UE and the network are synchronized, i.e., match their synchronization, so as to perform communication with same security information. Through the method of matching synchronization, the disclosure may prevent the UE and the system in communication from being weak in terms of security.

Through embodiments of the disclosure, in communication among a terminal (or a UE), a network, a gNB of a 5G radio access network (RAN), and the like in the 5G communication system, security information related to security may be delivered, and a procedure related to the delivery of the security information may be efficiently performed. By doing so, security-enhanced communication may be performed.

Also, through embodiments of the disclosure, with respect to security-related information of communication between a UE and a network, the UE and the network can manage their security information not to be outdated. Also, the UE and the network may synchronize with each other to perform communication with same security information. By doing so, when the UE and the system communicate with each other, it is possible to prevent the UE and the system from being weak in terms of security.

FIG. 1 illustrates an example of a UE and a network environment for a security procedure and a security scheme for protecting communication in a 5G network according to an embodiment of the disclosure.

Referring to FIG. 1, the 5G network may be assumed in an embodiment of the disclosure. Accordingly, a network system may include entities such as a user plane function (UPF) 131, a SMF 121, AMFs 111 and 113, 5G RANs 103 and 105, a user data management (UDM) 151, a policy control function (PCF) 161, and the like. In order to authenticate the entities, an authentication server function (AUSF) 141 and authentication, authorization and accounting (AAA) 171 may also be included in the network system of FIG. 1.

According to an embodiment, the network system may include a Non-3GPP Interworking Function (N3IWF) for a case in which the UE 101 communicates via non 3GPP access. In an embodiment, when communicating via non 3GPP access, session management may be controlled via the UE 101, the non 3GPP access, the N3IWF, and the SMF 121, and mobility management may be controlled via the UE 101, the non 3GPP access, the N3IWF, and the AMF 111. In the disclosure, the UE 101 may indicate a same object as the UE 101 of FIGS. 2 and 3.

A communication network in the disclosure may be assumed to be a 5G network, but when the same concept is applied to another system within the scope understandable to one of ordinary skill in the art, the communication network in the disclosure may be applied to the other system.

Figure 2:
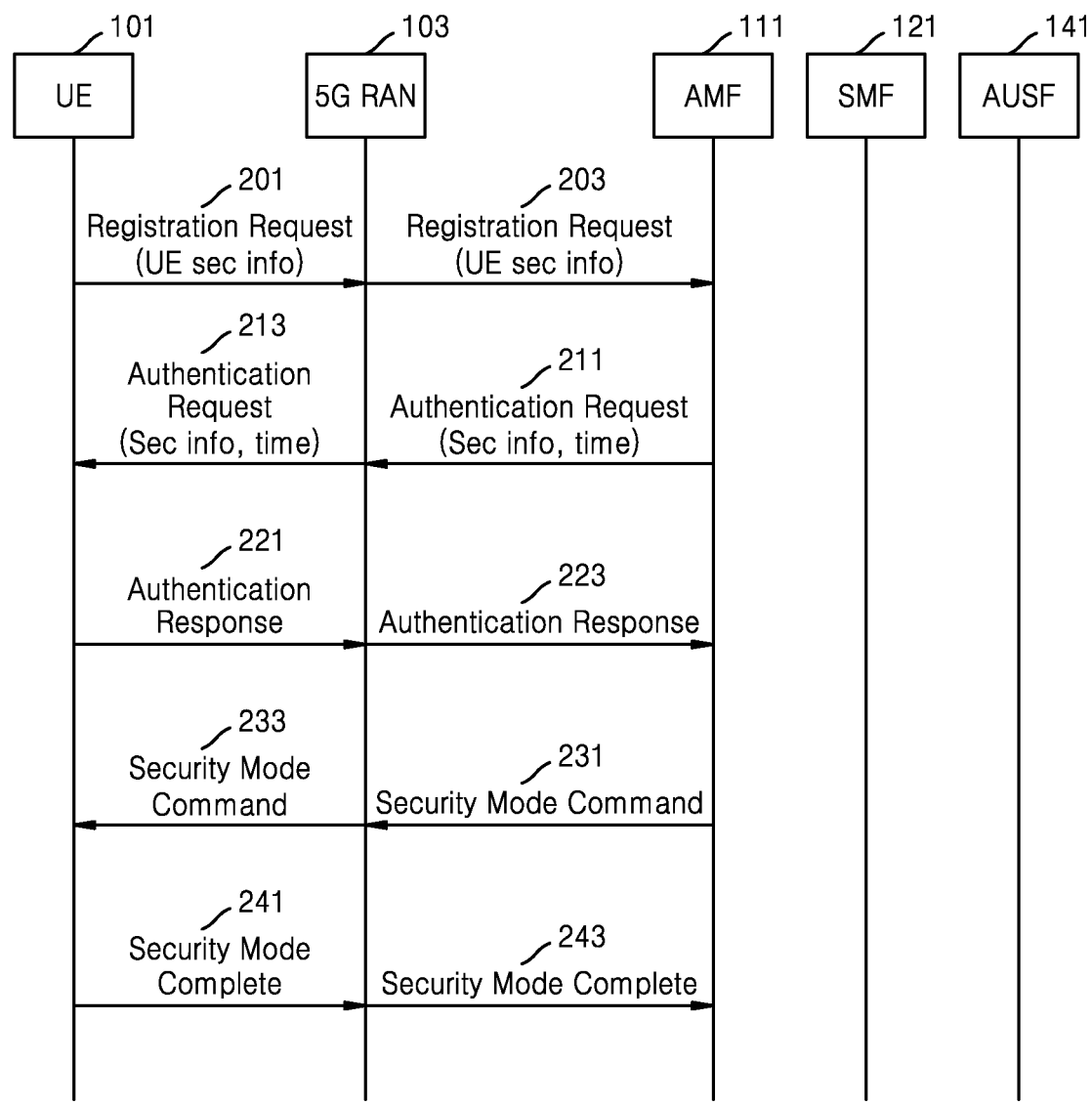
FIG. 2 illustrates an example of a security procedure and a security scheme for protecting communication in a 5G network according to an embodiment of the disclosure.

FIG. 2 illustrates an example of a security procedure and a security scheme for protecting communication in a 5G network according to an embodiment of the disclosure.

Referring to FIG. 2, in operations 201 and 203, the UE 101 may transmit a Registration Request message to the AMF 111. Here, the UE 101 may transmit information about UE security information to a network. The UE security information may include information related to a security key processing capability of the UE 101.

Afterward, in operations 211 and 213, the AMF 111 may transmit an Authentication Request message to the UE 101. Here, a network node (e.g., the AMF 111) may transmit security information of the UE 101 or security information of the network node. Such security information (e.g., the security information of the UE or the security information of the network node) is information related to a security key, and may include information indicating whether the network node is to use a security key as a key such as $K_{amf}$ in a previous system. Alternatively, in a case where $K_{amf}$ is generated as a network is developed to a system with a hierarchy higher than the previous system, the security information may include information indicating whether $K_{amf}$ is able to be continuously used as a key generation scheme is hierarchized. Alternatively, the security information may include information indicating whether the network node supports a public key generation scheme and thus can use a public key. Alternatively, the security information may include information such as a security key timer value indicating a validity time of a security key. The security information including the aforedescribed information may be transmitted from the AMF 111 to the UE 101 or the 5G RAN 103. According to an embodiment, the previous system may indicate a network system corresponding to the release before a network system corresponding to the 3GPP standard release by which the UE 101 or the AMF 111 currently operates. That is, when the network is developed to a system with a hierarchy, it means that the network is changed to a network system corresponding to the higher release (or the most-recent release).

The Authentication Request message of FIG. 2 may consist as shown in Table 1.

TABLE 1

| IEI | InformationElement | Type/Reference | Presence | Format | Length |
|---|---|---|---|---|---|
| | Extended protocol discriminator | Extended protocol discriminator | M | V | 1 |
| | Security header type | Security header type | M | V | ½ |
| | Spare half octet | Spare half octet | M | V | ½ |
| | Authentication request message identity | Message type | M | V | 1 |
| | ngKSI | NAS key set identifier | M | V | ½ |
| | Spare half octet | Spare half octet | M | V | ½ |
| | Security info | Security into | O | TLV | |
| | Timer | Timer | O | TLV | |
| 21 | Authentication parameter RAND (5G authentication challenge) | Authentication parameter | O | TV | 17 |
| 20 | Authentication parameter AUTN (5G authentication challenge) | Authentication parameter AUTN | O | TLV | 18 |
| 78 | EAP message | EAP message | O | TLV-E | 7-1503 |

In an embodiment, the security information may be transmitted in the form of an information element (IE) as in Table 2.

TABLE 2

| 8 | 7 | 6 | 5 | 4 | 3 | 2 | 1 | |
|---|---|---|---|---|---|---|---|---|
| | | | Security info IEI | | | | | octet 1 |
| | | | length of security info | | | | | octet 2 |
| | | | Security info | | | | | octets 3-n |

In an embodiment, the security information may be transmitted in a manner that both security information of <Table 3> and timer information indicating a validity time of a security key form an IE.

TABLE 3

| Security capability IEI |
| length of security capability |
| Security capability |
| Time |

According to an embodiment, in operations 221 and 223 thereafter, the UE 101 may transmit an Authentication Response message to the AMF 111.

According to an embodiment, in operations 231 and 233 thereafter, the AMF 111 may transmit a security mode command message to the UE 101.

According to an embodiment, in operations 241 and 243 thereafter, the UE 101 may transmit a security mode complete message to the AMF 111.

Figure 3:
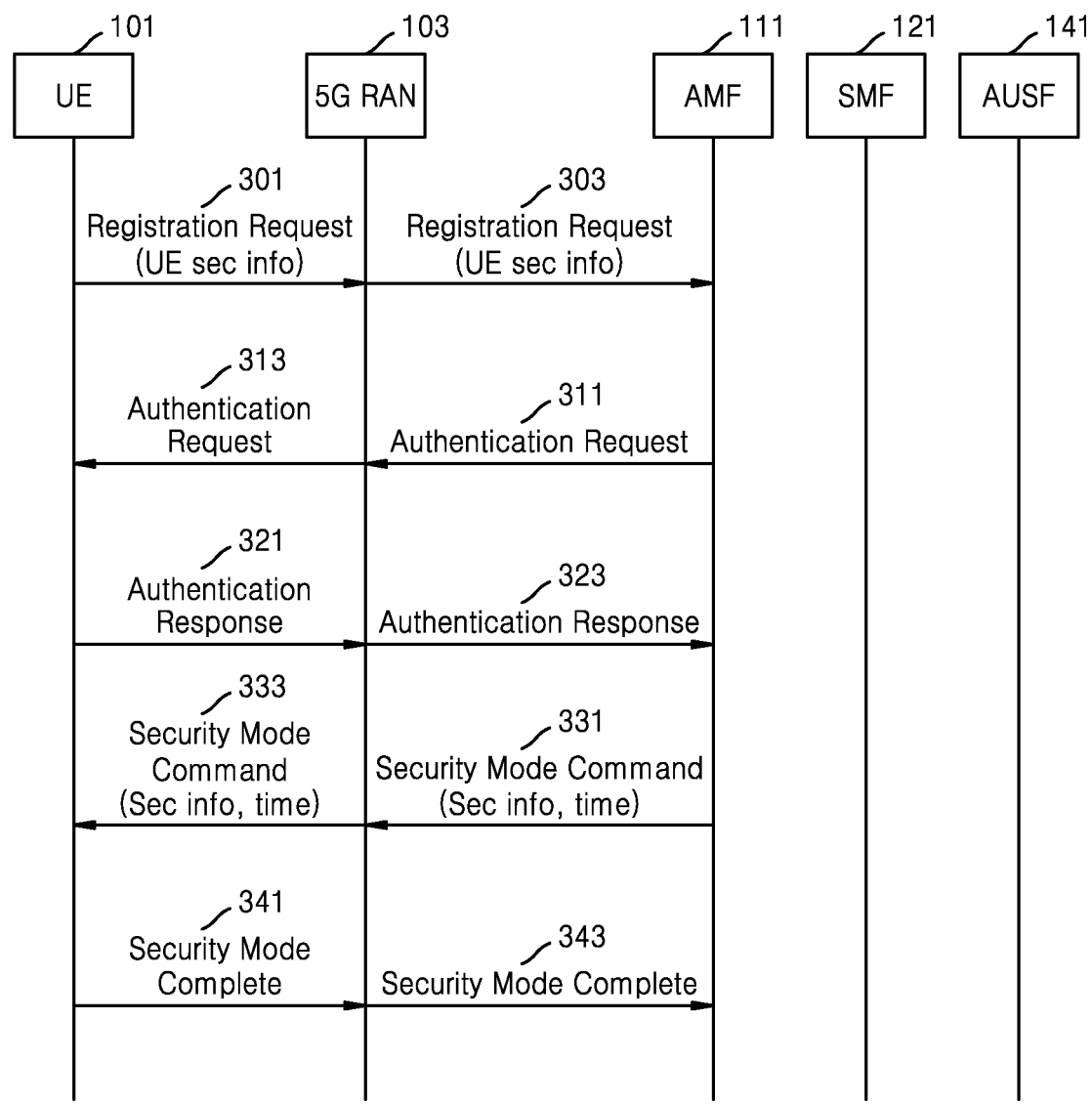
FIG. 3 illustrates an example of a security procedure and a security scheme for protecting communication in a 5G network according to another embodiment of the disclosure.

FIG. 3 illustrates an example of a security procedure and a security scheme for protecting communication in a 5G network according to another embodiment of the disclosure.

Referring to FIG. 3, in operations 301 and 303, the UE 101 may transmit a Registration Request message to the AMF 111.

Here, the UE 101 may transmit information about UE security information to a network. The UE security information may include information related to a security key processing capability of the UE 101.

According to an embodiment, in operations 311 and 313 thereafter, the AMF 111 may transmit an Authentication Request message to the UE 101.

According to an embodiment, in operations 321 and 323 thereafter, the UE 101 may transmit an Authentication Response message to the AMF 111.

According to an embodiment, in operations 331 and 333 thereafter, the AMF 111 may transmit a security mode command message to the UE 101.

Here, a network node (e.g., the AMF 111) may transmit security information of the UE 101 or security information of the network node. Such security information (e.g., the security information of the UE or the security information of the network node) is information related to a security key, and may include information indicating whether the network node is to use a key such as $K_{amf}$ in a previous system. Alternatively, in a case where $K_{amf}$ is generated as a network is developed to a system with a hierarchy higher than the previous system, the security information may include information indicating whether $K_{amf}$ is able to be continuously used as a key generation scheme is hierarchized. Alternatively, the security information may include information indicating whether the network node supports a public key generation scheme and thus can use a public key. Alternatively, the security information may include information such as a security key timer value indicating a validity time of a security key. The security information including the aforedescribed information may be transmitted from the AMF 111 to the UE 101 or the 5G RAN 103.

According to an embodiment, the security mode command message may consist as shown in Table 4.

TABLE 4

| IEI | Information Element | Type/Reference | Presence | Format | Length |
|---|---|---|---|---|---|
| | Extended protocol discriminator | Extended protocol discriminator 9.2 | M | V | 1 |
| | Security header type | Security header type 9.3 | M | V | ½ |
| | Spare half octet | Spare half octet 9.5 | M | V | ½ |

TABLE 4-continued

| IEI | Information Element | Type/Reference | Presence | Format | Length |
|---|---|---|---|---|---|
| | Security mode command message identity | message type 9.7 | M | V | 1 |
| | Selected NAS security algorithms | NAS security algorithms 9.11.3.34 | M | V | 1 |
| | nqKSI | NAS key set identifier 9.11.3.32 | M | V | ½ |
| | Spare half octet | Spare half octet 9.5 | M | V | ½ |
| | Replayed UE security capabilities | UE security capabilities 9.11.3.54 | M | LV | 3-9 |
| E- | IMEISV request | IMEISV request 9.11.3.28 | O | TV | 1 |
| 57 | Selected EPS NAS security algorithms | EPS NAS security algorithms 9.11.3.25 | O | TV | 2 |
| 36 | Additional 5G security information | Additional 5G security information 9.11.3.12 | O | TLV | 3 |
| 78 | EAP message | EAP message 9.11.2.2 | O | TLV-E | 7-1503 |
| 38 | ABBA | ABBA 9.11.3.10 | O | TLV | 4-n |
| 19 | Replayed S1 UE security capabilities | S1 UE security capabilities 9.11.3.48A | O | TLV | 4-7 |
| | Sec capa | Sec capa | O | TLV | |

According to an embodiment, the security information may be transmitted in the form of an IE as in Table 5.

TABLE 5

| 8 | 7 | 6 | 5 | 4 | 3 | 2 | 1 | |
|---|---|---|---|---|---|---|---|---|
| | | | Security info IEI | | | | | octet 1 |
| | | | length of security info | | | | | octet 2 |
| | | | Security info | | | | | octets 3-n |

According to an embodiment, the security information may be transmitted in a manner that both security information of Table 6 and timer information indicating a validity time of a security key form an IE.

TABLE 6

| Security capability IEI |
|---|
| length of security capability |
| Security capability |
| Time |

According to an embodiment, in operations 341 and 343 thereafter, the UE 101 may transmit a security mode complete message to the AMF 111.

Figure 4:
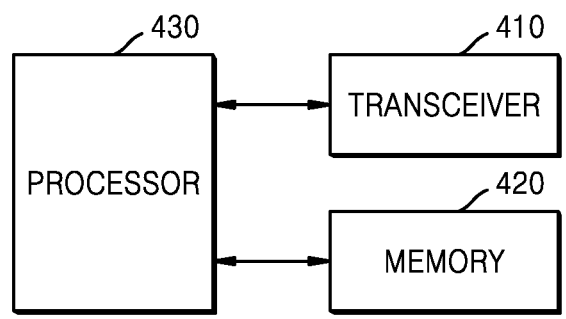
FIG. 4 illustrates a detailed structure of a UE according to an embodiment of the disclosure.

FIG. 4 illustrates a detailed structure of a UE according to an embodiment of the disclosure. The UE of FIG. 4 may indicate the UE 101 of FIG. 1 or the UE 101 of FIGS. 2 and 3.

As illustrated in FIG. 4, the UE of the disclosure may include a processor 430, a transceiver 410, and a memory 420. However, elements of the UE are not limited to the example described above. For example, the UE may include more elements than the afore-described elements or may include fewer elements than the afore-described elements. Furthermore, the processor 430, the transceiver 410, and the memory 420 may be implemented as one chip.

According to some embodiments, the processor 430 may control a series of processes to allow the UE to operate according to the aforementioned embodiment of the disclosure. For example, the processor 430 may control the elements of the UE to perform a method of protecting information in the 5G communication system according to an embodiment of the disclosure. The processor 430 may correspond to a plurality of processors, and may execute a program stored in the memory 420 to perform the aforedescribed operation of protecting information of the disclosure.

The transceiver 410 may transmit or receive a signal to or from a BS. The signal being transmitted or received to or from the BS may include control information and data. The transceiver 410 may include a radio frequency (RF) transmitter configured to up-convert and amplify a frequency of a signal to be transmitted, and a RF receiver configured to low-noise amplify a received signal and down-convert a frequency thereof. However, the configuration of the transceiver 410 is merely an example, and elements of the transceiver 410 are not limited to the RF transmitter and the RF receiver. Also, the transceiver 410 may receive a signal by using a radio channel and output the signal to the processor 430, and may transmit a signal output from the processor 430, by using a radio channel.

According to some embodiments, the memory 420 may store programs and data required for the UE to operate. Also, the memory 420 may store control information or data included in a signal transmitted or received by the UE. The memory 420 may include any or a combination of storage media such as read-only memory (ROM), random access memory (RAM), a hard disk, a compact disc (CD)-ROM, and a digital versatile disc (DVD). Also, the memory 420 may correspond to a plurality of memories. According to some embodiments, the memory 420 may store a program of the embodiments of the disclosure, the program being for protecting information in the 5G communication system.

Figure 5:
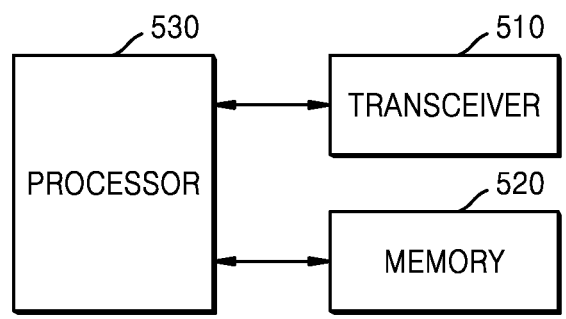
FIG. 5 illustrates a detailed structure of a BS according to an embodiment of the disclosure.

FIG. 5 illustrates a detailed structure of a BS according to some embodiments of the disclosure. The BS of FIG. 5 may be included in the 5G RAN 103.

As illustrated in FIG. 5, the BS of the disclosure may include a processor 530, a transceiver 510, and a memory 520. However, elements of the BS are not limited to the example described above. For example, the BS may include more elements than the afore-described elements or may include fewer elements than the afore-described elements. Furthermore, the processor 530, the transceiver 510, and the memory 520 may be implemented as one chip.

According to some embodiments, the processor 530 may control a series of processes to allow the BS to operate according to the aforementioned embodiment of the disclosure. For example, the processor 530 may control the elements of the BS to perform a method of protecting information in the 5G communication system according to an embodiment of the disclosure.

The transceiver 510 may transmit or receive a signal to or from a UE. The signal being transmitted or received to or from the UE may include control information and data. The transceiver 510 may include a RF transmitter configured to up-convert and amplify a frequency of a signal to be transmitted, and a RF receiver configured to low-noise amplify a received signal and down-convert a frequency thereof. However, the configuration of the transceiver 510 is merely an example, and elements of the transceiver 510 are not limited to the RF transmitter and the RF receiver. Also, the transceiver 510 may receive a signal by using a radio channel and output the signal to the processor 530, and may transmit a signal output from the processor 530, by using a radio channel. The processor 530 may correspond to a plurality of processors, and may execute a program stored in the memory 520 to perform the aforedescribed method of protecting information in a wireless communication system of the disclosure.

According to some embodiments, the memory 520 may store programs and data required for the BS to operate. Also, the memory 520 may store control information or data included in a signal transmitted or received by the BS. The memory 520 may include any or a combination of storage media such as ROM, RAM, a hard disk, a CD-ROM, and a DVD. Also, the memory 520 may correspond to a plurality of memories. According to some embodiments, the memory 520 may store a program of the embodiments of the disclosure, the program being for performing the method of protecting information in the 5G communication system.

According to an embodiment of the disclosure, an operating method of a UE in a wireless communication system may include: transmitting, to an AMF, a registration request message including security information related to a security key processing capability of the UE; receiving, from the AMF, an authentication request message; transmitting, to the AMF, an authentication response message in response to the authentication request message; receiving, from the AMF, a security mode command message; and transmitting a security mode complete message in response to the security mode command message.

In an embodiment, security information of the AMF may include at least one of information indicating whether to use a security key of the AMF, information indicating whether to use a public key of the AMF, or information about a timer value indicating a validity time of a security key of the AMF.

In an embodiment, the information indicating whether to use a security key of the AMF may include information indicating whether to use a security key of the AMF, based on a change in a network system.

In an embodiment, the authentication request message may include at least one of the security information of the AMF or the security information related to the security key processing capability of the UE.

In an embodiment, the security mode command message may include at least one of the security information of the AMF or the security information related to the security key processing capability of the UE.

According to an embodiment of the disclosure, a UE in a wireless communication system may include: a transceiver; and at least one processor configured to transmit, via the transceiver to an AMF, a registration request message including security information related to a security key processing capability of the UE; receive, via the transceiver from the AMF, an authentication request message; transmit, via the transceiver to the AMF, an authentication response message in response to the authentication request message; receive, via the transceiver from the AMF, a security mode command message; and transmit, via the transceiver, a security mode complete message in response to the security mode command message.

In an embodiment, security information of the AMF may include at least one of information indicating whether to use a security key of the AMF, information indicating whether to use a public key of the AMF, or information about a timer value indicating a validity time of a security key of the AMF.

In an embodiment, the information indicating whether to use a security key of the AMF may include information indicating whether to use a security key of the AMF, based on a change in a network system.

In an embodiment, the authentication request message may include at least one of the security information of the AMF or the security information related to the security key processing capability of the UE.

In an embodiment, the security mode command message may include at least one of the security information of the AMF or the security information related to the security key processing capability of the UE.

According to an embodiment of the disclosure, an operating method of an AMF in a wireless communication system may include: receiving, from a UE, a registration request message including security information related to a security key processing capability of the UE; transmitting, to the UE, an authentication request message; receiving, from the UE, an authentication response message in response to the authentication request message; transmitting, to the UE, a security mode command message; and receiving, from the UE, a security mode complete message in response to the security mode command message.

In an embodiment, security information of the AMF may include at least one of information indicating whether to use a security key of the AMF, information indicating whether to use a public key of the AMF, or information about a timer value indicating a validity time of a security key of the AMF.

In an embodiment, the information indicating whether to use a security key of the AMF may include information indicating whether to use a security key of the AMF, based on a change in a network system.

In an embodiment, the authentication request message may include at least one of the security information of the AMF or the security information related to a security key processing capability of the UE.

In an embodiment, the security mode command message may include at least one of the security information of the AMF or the security information related to a security key processing capability of the UE.

The methods according to the embodiments of the disclosure as described herein or in the following claims may be implemented as hardware, software, or a combination of hardware and software.

When implemented as software, a computer-readable storage medium or a computer program product storing one or more programs (e.g., software modules) may be provided. The one or more programs stored in the computer-readable storage medium or the computer program product are configured for execution by one or more processors in an electronic device. The one or more programs include instructions directing the electronic device to execute the methods according to the embodiments of the disclosure as described in the claims or the specification.

The programs (e.g., software modules or software) may be stored in non-volatile memory including random access memory (RAM) or flash memory, read only memory (ROM), electrically erasable programmable read only memory (EEPROM), a magnetic disc storage device, a compact disc (CD)-ROM, a digital versatile disc (DVD), another optical storage device, or a magnetic cassette. Alternatively, the programs may be stored in memory including a combination of some or all of the above-mentioned storage media. A plurality of such memories may be included.

In addition, the programs may be stored in an attachable storage device accessible through any or a combination of communication networks such as Internet, an intranet, a local area network (LAN), a wide LAN (WLAN), a storage area network (SAN), or the like. Such a storage device may access, via an external port, a device performing the embodiments of the disclosure. Furthermore, a separate storage device on the communication network may access the electronic device performing the embodiments of the disclosure.

In the disclosure, the terms "computer program product" or "computer-readable recording medium" are used to totally indicate a medium such as a memory, a hard disc mounted in a hard disk drive, and a signal. The "computer program product" or the "computer-readable recording medium" is a means to be provided to the method of protecting information in the 5G communication system according to the disclosure.

In the afore-described embodiments of the disclosure, configuration elements included in the disclosure are expressed in a singular or plural form according to the embodiments of the disclosure. However, the singular or plural form is appropriately selected for convenience of explanation and the disclosure is not limited thereto. As such, a configuration element expressed in a plural form may also be configured as a single element, and a configuration element expressed in a singular form may also be configured as plural elements.

Specific embodiments of the disclosure are described in the descriptions of the disclosure, but it will be understood that various modifications may be made without departing the scope of the disclosure. Thus, the scope of the disclosure is not limited to the embodiments described herein and should be defined by the appended claims and their equivalents.

The invention claimed is:

1. An operating method of a user equipment (UE) in a wireless communication system, the operating method comprising:
   transmitting, to an access and mobility management function (AMF), a registration request message comprising UE security information related to a security key processing capability of the UE;
   receiving, from the AMF, an authentication request message comprising AMF security information related to a security key of the AMF and timer information indicating a validity time of the security key of the AMF;
   transmitting, to the AMF, an authentication response message in response to the authentication request message;
   receiving, from the AMF, a security mode command message; and
   transmitting a security mode complete message in response to the security mode command message.

2. The operating method of claim 1, wherein the AMF security information comprises at least one of information indicating whether to use the security key of the AMF, or information indicating whether to use a public key of the AMF.

3. The operating method of claim 2, wherein the information indicating whether to use the security key of the AMF comprises at least one of information indicating whether to use a key in a previous network system as the security key of the AMF, or information indicating whether to use the security key of the AMF generated in a network system with a hierarchy higher than the previous network system.

4. The operating method of claim 1, wherein the authentication request message comprises the UE security information related to the security key processing capability of the UE.

5. The operating method of claim 1, wherein the security mode command message comprises at least one of the AMF security information or the UE security information related to the security key processing capability of the UE.

6. A user equipment (UE) in a wireless communication system, the UE comprising:
   a transceiver; and
   at least one processor configured to:
      transmit, via the transceiver to an access and mobility management function (AMF), a registration request message comprising UE security information related to a security key processing capability of the UE,
      receive, via the transceiver from the AMF, an authentication request message comprising AMF security information related to a security key of the AMF and timer information indicating a validity time of the security key of the AMF,
      transmit, via the transceiver to the AMF, an authentication response message in response to the authentication request message,
      receive, via the transceiver from the AMF, a security mode command message, and
      transmit, via the transceiver, a security mode complete message in response to the security mode command message.

7. The UE of claim 6, wherein AMF security information comprises at least one of information indicating whether to use the security key of the AMF, or information indicating whether to use a public key of the AMF.

8. The UE of claim 7, wherein the information indicating whether to use the security key of the AMF comprises at least one of information indicating whether to use a key in a previous network system as the security key of the AMF, or information indicating whether to use the security key of the AMF generated in a network system with a hierarchy higher than the previous network system.

9. The UE of claim 6, wherein the authentication request message comprises the UE security information related to the security key processing capability of the UE.

10. The UE of claim 6, wherein the security mode command message comprises at least one of the AMF security information or the UE security information related to the security key processing capability of the UE.

11. An operating method of an access and mobility management function (AMF) in a wireless communication system, the operating method comprising:
   receiving, from a user equipment (UE), a registration request message comprising UE security information related to a security key processing capability of the UE;

transmitting, to the UE, an authentication request message comprising AMF security information related to a security key of the AMF and timer information indicating a validity time of the security key of the AMF;

receiving, from the UE, an authentication response message in response to the authentication request message;

transmitting, to the UE, a security mode command message; and receiving, from the UE, a security mode complete message in response to the security mode command message.

12. The operating method of claim 11, wherein the AMF security information of the AMF comprises at least one of information indicating whether to use the security key of the AMF, or information indicating whether to use a public key of the AMF.

13. The operating method of claim 12, wherein the information indicating whether to use the security key of the AMF comprises at least one of information indicating whether to use a key in a previous network system as the security key of the AMF, or information indicating whether to use the security key of the AMF generated in a network system with a hierarchy higher than the previous network system.

14. The operating method of claim 11, wherein the authentication request message comprises the UE security information related to the security key processing capability of the UE.

15. The operating method of claim 11, wherein the security mode command message comprises at least one of the AMF security information or the UE security information related to the security key processing capability of the UE.

* * * * *